United States Patent

Shimbara et al.

[11] Patent Number: 5,961,559
[45] Date of Patent: Oct. 5, 1999

[54] AUTOMATIC GUIDED VEHICLE AND AUTOMATIC GUIDED VEHICLE CONTROL METHOD

[75] Inventors: Yoshimi Shimbara; Koji Teramoto; Koichi Moriyama, all of Hiroshima, Japan

[73] Assignee: Mazda Motor Corporation, Hiroshima, Japan

[21] Appl. No.: 08/829,689

[22] Filed: Mar. 31, 1997

[30] Foreign Application Priority Data

Mar. 29, 1996 [JP] Japan ..................................... 8-134485
Jul. 26, 1996 [JP] Japan ..................................... 8-197195

[51] Int. Cl.$^6$ ....................................................... G05D 1/00
[52] U.S. Cl. .............................. 701/23; 701/69; 701/79; 701/211; 180/168
[58] Field of Search ................................ 701/23, 41, 48, 701/68, 69, 72, 74, 202, 210, 79, 211; 180/168, 233, 248, 249

[56] References Cited

U.S. PATENT DOCUMENTS

| | | | |
|---|---|---|---|
| 4,986,388 | 1/1991 | Matsuda | 701/69 |
| 5,060,747 | 10/1991 | Eto | 701/69 |
| 5,099,944 | 3/1992 | Kageyama et al. | 701/69 |
| 5,316,099 | 5/1994 | Inoue et al. | 180/140 |
| 5,346,032 | 9/1994 | Sasaki | 701/69 |
| 5,701,247 | 12/1997 | Sasaki | 701/69 |

FOREIGN PATENT DOCUMENTS 61-48322  10/1986  Japan .

Primary Examiner—William A. Cuchlinski, Jr.
Assistant Examiner—Gertrude Arthur
Attorney, Agent, or Firm—Sixbey, Friedman, Leedom & Ferguson, P.C.; Donald R. Studebaker

[57] ABSTRACT

A automatic guided vehicle which drives drive wheels differentially to change its traveling direction applies braking by imposing reverse torque to wheel drive motors when cornering or when rapid braking is demanded. This braking corrects the traveling direction of the automatic guided vehicle when the vehicle is apt to depart from its intended path, enabling a automatic guided vehicle even having a large inertia to make a smooth turn at a sharp corner.

32 Claims, 15 Drawing Sheets

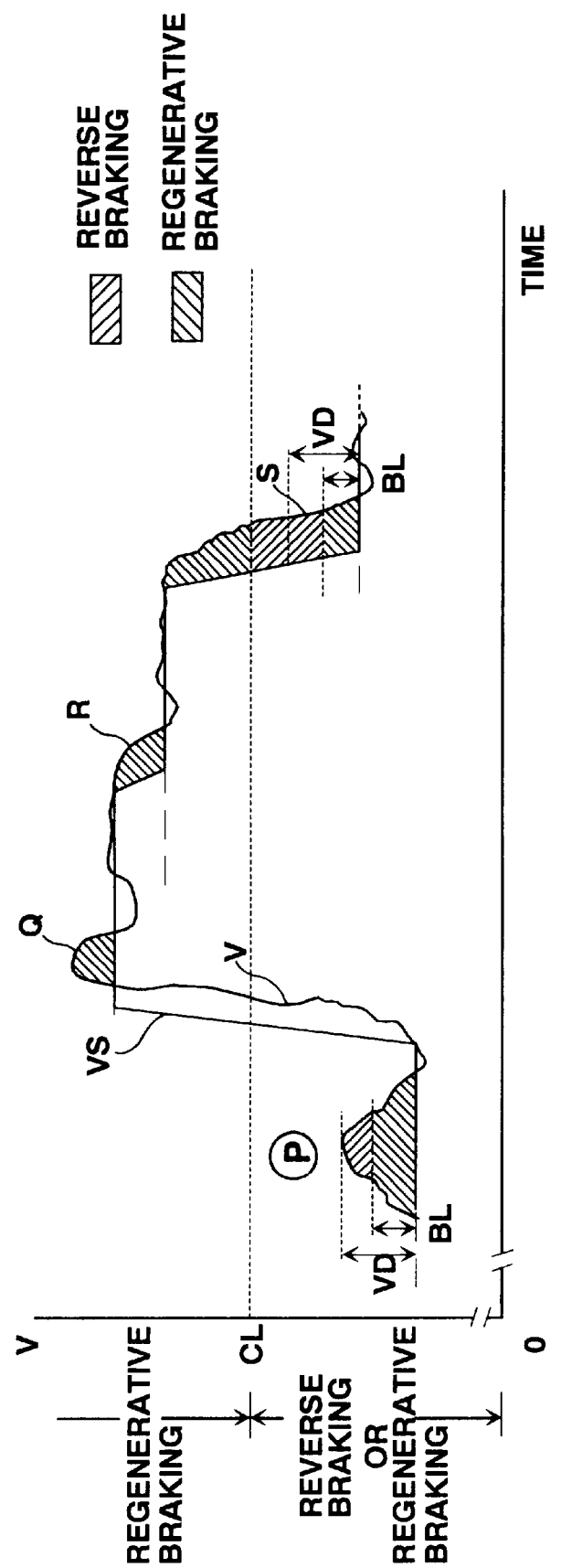

AUTOMATIC GUIDED VEHICLE AND AUTOMATIC GUIDED VEHICLE CONTROL METHOD

BACKGROUND OF THE INVENTION

1. Field of the Invention

This invention relates to a automatic guided vehicle traveling along a guide path and a method of controlling the automatic guided vehicle.

2. Description of Related Art

Typically, automatic guided vehicles are equipped with electric motors, such as, for example, a compound-wound motor comprising an armature, a series field system, a switch for the series field system, a shunt field system, a shunt field resistance and a switch for the shunt field system. This type of electric motor produces a regenerated current while the automatic guided vehicle runs on a downhill slope at a speed higher than a specified speed. The regenerated current is effectively used to turn on the shunt field switch with an amplified output from a voltage discriminator when it exceeds a specified level, short-circuiting the shunt field resistance to convert the shunt field system into an intensified field system, and hence to decrease the rotational speed of the armature so as to prevent the automatic guided vehicle from falling into reckless running. Such an automatic guided motor-driven vehicle is known from, for example, Japanese Patent Publication No. 61-48322.

According to the prior art automatic guided vehicle, while a regenerated current, or regenerated energy, is effectively used with an advantage of applying regenerative braking to the automatic guided vehicle, the regenerated current is hard to use for controlling a traveling direction of the automatic guided vehicle.

Japanese Patent Application No. 8-134485, filed by the same applicant of this application, describes a useful manner of regenerated current for controlling a automatic guided vehicle to travel along a prearranged path established by a guide means. The vehicle detects a lateral deviation from the path guide means by means of a magnetic sensor comprising a number of hole elements and controls regenerated current (regenerated braking force) of the right and left wheel drive motors by the pulse width modulation (PWM) method.

While controlling the regenerated current of the wheel drive motor is helpful in saving electric power of a battery and improves the performance of follow-up the path guide means during traveling flat path or a down slope, it is hard for regenerative braking to produce strong braking force when the automatic guided vehicle travels at lower speeds and to stop at an intended position.

SUMMARY OF THE INVENTION

It is an object of the present invention to provide a method of controlling precisely the traveling direction of a automatic guided vehicle by applying reverse torque to wheel drive motors when the automatic guided vehicle is apt to shift from its prearranged path at a corner or during braking It is another object of the invention to provide a automatic guided vehicle control method by which the vehicle can travel stably and reliably brake even on a down slope and/or at low speeds.

The above objects are accomplished by providing a vehicle control method for controlling the direction of a automatic guided vehicle by differentially driving right and left wheel drive motors, which comprises the steps of detecting a lateral deviation of the automatic guided vehicle from a prearranged travel path, calculating a speed difference between rotational speeds of the wheel drive motors necessary to correct the lateral deviation, and applying reverse torque to the wheel drive motors according to the speed difference to differentially drive the right and left wheels. The reverse torque is varied by controlling a consumption of regenerated energy of the motor during deceleration in the pulse width modulation method. Drive and brake control of the wheel drive motors are performed by the use of a drive control map prescribing a relationship between lateral deviation and travel speed and a brake control map prescribing a relationship between lateral deviation and controlled braking variable.

According to a preferred embodiment of the invention, either one of the wheel drive motors is driven by regenerative control when the speed difference is greater than a specified speed difference. When the speed difference is greater than the specified speed difference reverse braking may be applied during deceleration.

The automatic guided vehicle, guided by path guide means to travel on a prearranged path established by the path guide means, has a control system for controlling the traveling direction by driving right and left drive wheels at different speeds, detecting whether there is a demand of deceleration, detecting a lateral deviation of the automatic guided vehicle from the prearranged path and controlling regenerated energy of wheel drive motor according to the lateral deviation when a deceleration demand is detected.

The control system controls consumption of regenerated energy by pulse width modulation control to brake the automatic guided vehicle. The control system further reverses the wheel drive motor for braking during deceleration. The utilization is made of a brake control map prescribing a relationship between lateral deviation and controlled braking variable to controlling the wheel drive motor.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 15 is a graphical illustration showing speed control.

DETAILED DESCRIPTION OF THE PREFERRED EMBODIMENTS

Figure 1:
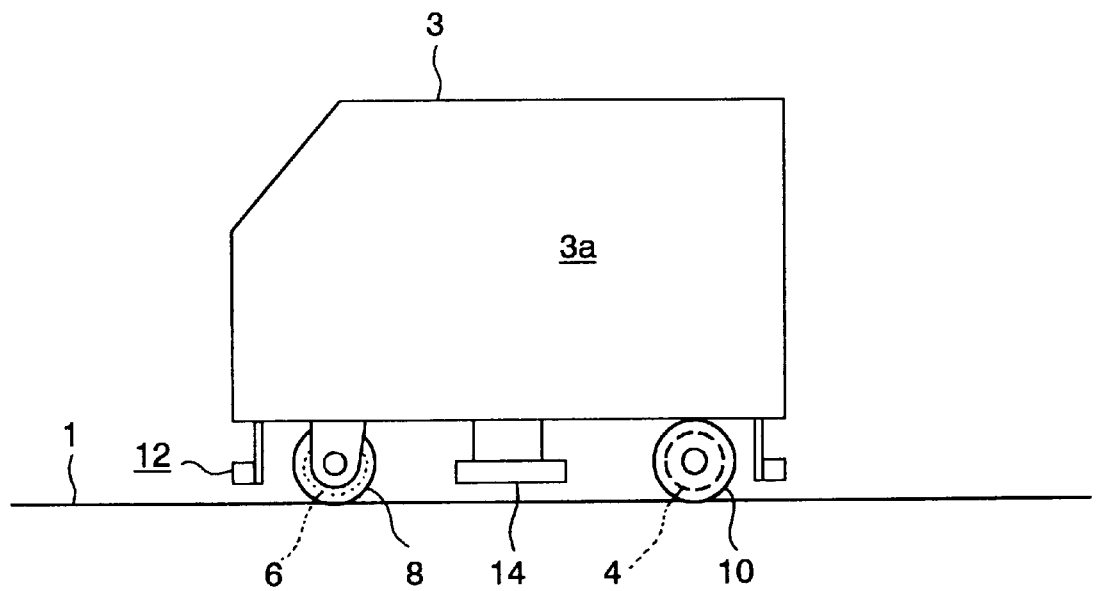
FIG. 1 is a side view of a automatic guided vehicle in accordance with a specific embodiment of the invention.
Figure 2:
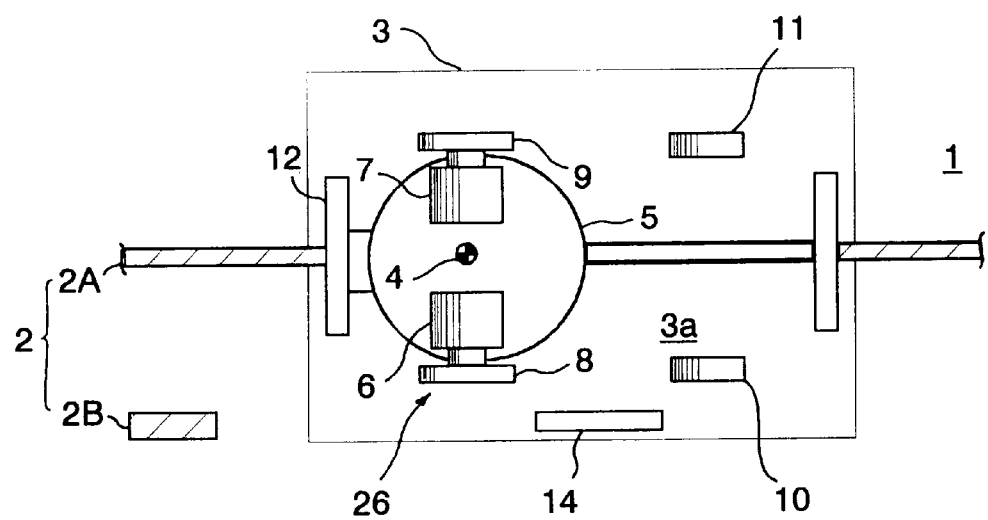
FIG. 2 is a bottom view of the automatic guided vehicle of FIG. 1.
Figure 3A:
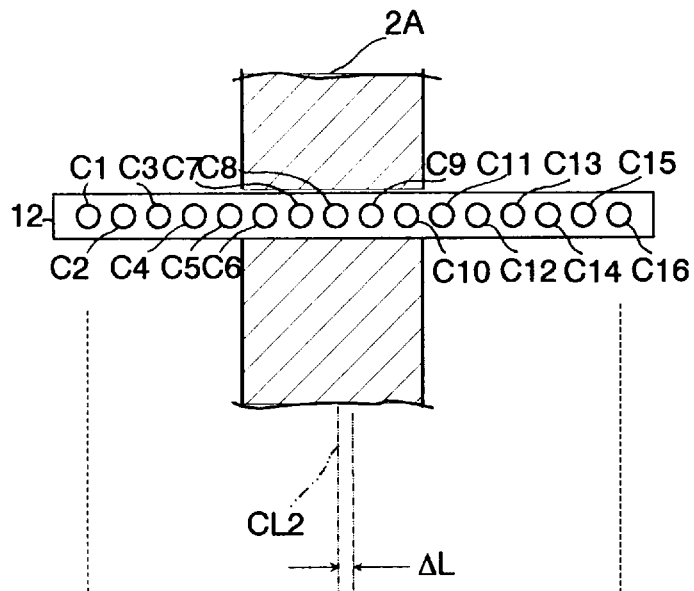
FIG. 3A is an explanatory illustrating a relationship between lateral deviation of a path guide sensor and a control rule.

Referring to the drawings in detail, in particular, to FIGS. 1 and 2, an automatic guided motor-driven vehicle 3 runs on a floor 1 along a prearranged traveling path which is established by a guide means 2, such as a magnetic guide tape or board or an optical guide tape or board, laid on the floor 1. The guide means 2 comprises a path guide tape 2A and a plurality of travel instruction board 2B. The path guide tape 2A in the form of a tape attached to the floor 1 defines a path on which the vehicle 3 travels. The travel instruction board 2B provides a travel instruction information including a travel speed and deceleration at each designated location along the traveling path. The vehicle 3 is equipped with a steering device 26 comprising a steering disk 5 pivoted for rotation on a center shaft 4 secured to the under side of the vehicle body 3a and a pair of electric drive motors 6 and 7 secured to the steering disk 5 at diametrically opposite positions with respect to the center shaft 4. The drive motor 6 is directly connected to a front right drive wheel 8, and the drive motor 7 is directly connected to a front left wheel 9. The vehicle 3 has a pair of driven wheels, namely a rear right wheel 10 and a rear left wheel 11, supported by the vehicle body 3a. Each driven wheel may comprise a caster connected directly to the vehicle body 3a or a wheel connected by means of a swivel to the vehicle body 3a. The vehicle 3 has a path guide sensor 12 and a travel instruction sensor 14 sensitive to the guide means 2. The path guide sensor 12 has an elongated shape extending in a transverse direction of the vehicle body 3a and generally oriented perpendicularly to the traveling direction of the vehicle 3. The travel instruction sensor 14 has an elongated shape extending in a longitudinal direction of the vehicle body 3a and generally oriented in parallel to the traveling direction of the vehicle 3. These sensors 12 and 14 may be magnetic sensors if a magnetic guide tape is employed as the guide means 2 or may be an optical sensor if an optical guide tape is employed as the guide means 2. As shown in FIG. 3A, the path guide sensor 12 has a row of sixteen sensor elements C1–C16 arranged at regular intervals. Each sensor element senses the guide means 2, it provides a specific level of electric output. If a magnetic tape is employed as the guide means 2, a magnetic hole element may preferably be employed as the sensor elements C1–C16. In this instance, the path guide means 2 has a width sensed by at least four out of the sixteen sensor elements C1–C16.

The lateral deviation of the automatic guided vehicle 3 is given by a center position value of the path guide sensor 12 relative to the center CL2 of the path guide tape 2A. Specifically, each sensor element is given a specific location number. The center position value is calculated as an arithmetic mean value of location numbers of sensor elements which detect the path guide tape 2A and provide a specified level of output. For example, in the event where the sixth to ninth sensor elements C6–C9 provide a specified level of output, the center position value is given as an arithmetic mean value of their position numbers, six to nine, which is 7.5.

The drive motors 7 and 8, and hence the right and left drive wheels 8 and 9, are controlled through a drive control system (which will be described later) to be independently driven at different speeds according to the shifted lateral distance, i.e. the lateral deviation, to correct the traveling path or the traveling direction of the vehicle 3.

Figure 4:
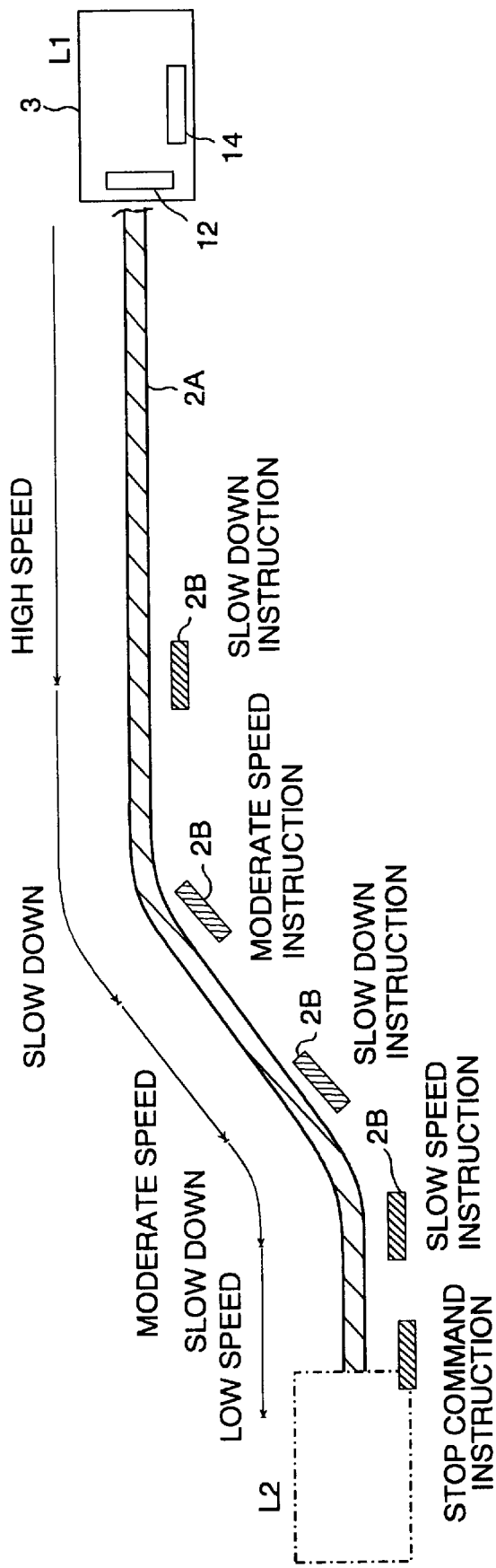
FIG. 4 is an illustration of a prearranged path established by a path guide means.

FIG. 4 shows the guide means 2 by way of example. The traveling path is established between, for example, a loading station L1 and an unloading station L2 by a path guide tape 2A. The traveling path has straight path sections S1, S2 and S3 curved path sections P1 and P2 between each adjacent straight path sections. The travel instruction boards 2B are located before and after the curved path sections P1 and P2. For example, each travel instruction board 2B is made up of a thine plastic sheet on which an eight-bit arrangement of N-polar and S-polar magnetic stripes is coated. This type of instruction system can provide 256 different commands, such as various speeds, deceleration commands, a stop command and the like. According with one of traveling schedules, the vehicle is controlled to travel at a high speed until approaching the first curved path section, to decelerate before entering the first curved path section P1, to travel at a moderate speed between the first and second path sections P1 and P2, to decelerate before entering the second curved path section P2, and to travel at a low speed after the second path section P2 to the unloading station L2. At specific locations there are arranged the travel instruction boards 2B providing the specific commands along the path guide tape 2A. The travel instruction sensor 14 reads the respective commands to control the drive motor 7 and 8 through the drive control system.

Figure 3B:
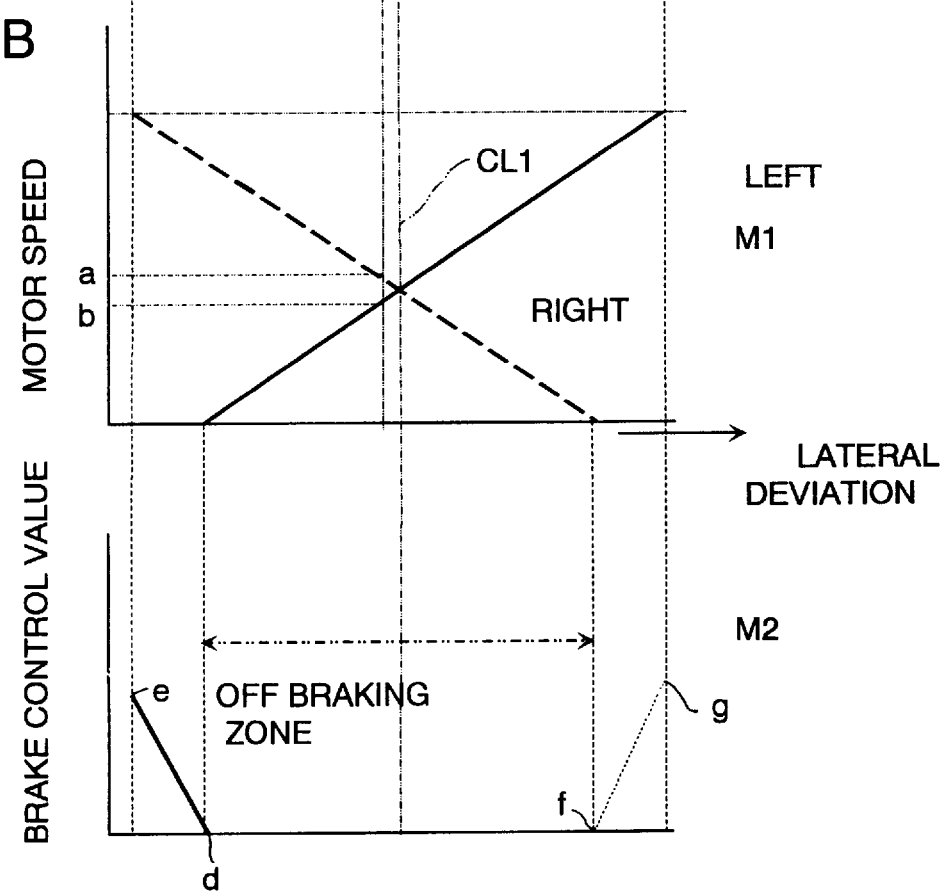
FIG. 3B is an illustration of a drive control map for backward travel.
Figure 5:
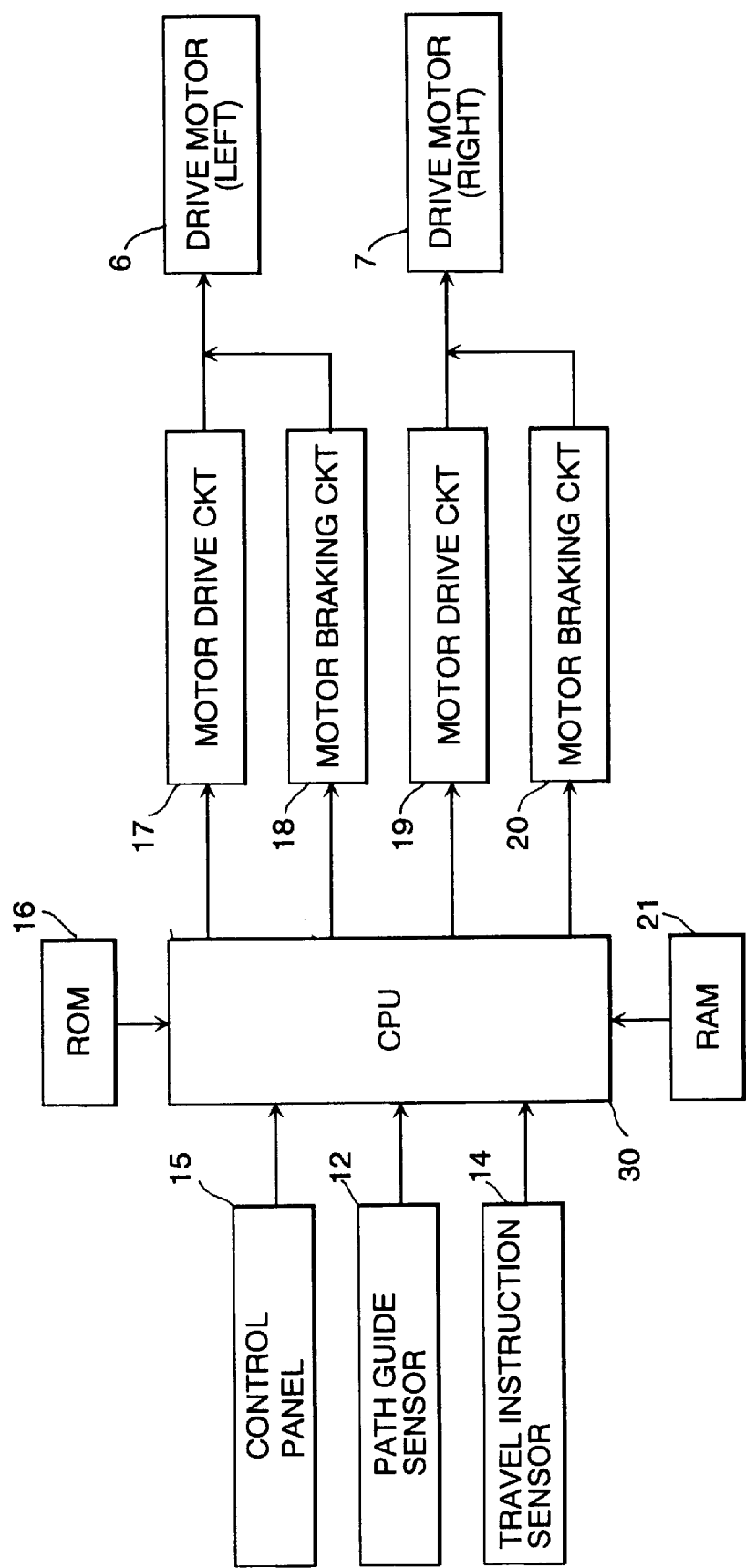
FIG. 5 is a block diagram of a vehicle control system.

FIG. 5 shows the drive control system in block diagram. The drive control system includes a control unit 30, such as comprising a central processing unit (CPU), which receives a start command signal SACS or a stop command signal SACS from a start/stop switch 15, the path guide sensor 12 and the travel instruction sensor 14. A read only memory (ROM) 16 stores control programs and control maps for independently controlling the drive motors 6 and 7. Random access memory (RAM) 21 stores various data of working area, control parameters, and control maps, such as a drive control map M1 and a brake control map M2 shown in FIG. 3A. Between the control unit (CPU) 30 and the respective drive motors 6 and 7 there are a motor driving circuit 17, 19 and a motor braking circuit 18, 20. Each motor driving circuit 17, 19 drives the drive motor 6, 7 by the pulse width modulation (PWM) control in which the active ratio of the drive motor is varied. The term "active ratio" shall mean and refer to the ratio of active time relative to inactive time of the motor. Each braking, circuit 18, 20 controls a consumption of regenerated energy produced by the drive motor 6, 7 by the pulse width modulation (PWM) control to pass a regenerated current through the drive motor 6, 7 so as to impose on the drive motor 6, 7 reverse torque according to the active ratio. In addition to the drive control map M1 for forward travel of the automatic guided vehicle 3, the RAM (RAM) 21 contains a drive control map for backward travel of the automatic guided vehicle 3 as shown in FIG. 3B in order to adapt the backward travel characteristics of the automatic guided vehicle 3 having a path guide sensor 12 at the rear end thereof.

The drive control map M1 presented in FIG. 3A shows a speed control rule for motor speeds with respect to lateral deviations of the vehicle from the path guide tape 2A. In this drive control map M1, CL1 indicates the center of the vehicle 3 as viewed in the transverse direction, and CL2 indicates the center of the path guide tape 2A. The path guide sensor 12 (ie. the vehicle 3) shown in FIG. 3A is shifted right by a lateral deviation ΔL. In order to bring the vehicle center CL1 into agreement with the guide center CL2 by removing the lateral deviation ΔL, the drive control map M1 demonstrates that it is necessary to drive the right drive wheel 8, and hence the drive motor 7, at a speed "a" higher than the left drive wheel 9, and hence the drive motor 6 at a speed "b". On the other hand, the brake control map M2 presented in FIG. 3A shows a control rule for controlled braking variables with respect to lateral deviations of the vehicle from the path guide tape 2A. The brake control map M2 demonstrates that the controlled brake variable for braking of the left drive motor 6 takes zero (labeled "d") when the right drive motor 7 runs at a speed with a specified difference from the speed of the left drive motor 6, and increases when the difference increases, and finally takes the maximum level (labeled "e") when the right drive motor 7 runs at its highest speed. Similarly, the brake control map M2 demonstrates that the controlled braking variable for braking of the right drive motor 7 takes zero (labeled "f") when the left drive motor 6 runs at a speed with a specified difference from the speed of the right drive motor 7, and increases when the difference increases, and finally takes the maximum level (labeled "g") when the left drive motor 6 runs at its highest speed. Further, the control unit (CPU) 30 is equipped with a vehicle speed decreasing control function and a regenerated current control function which are described in detail later.

Figure 6:
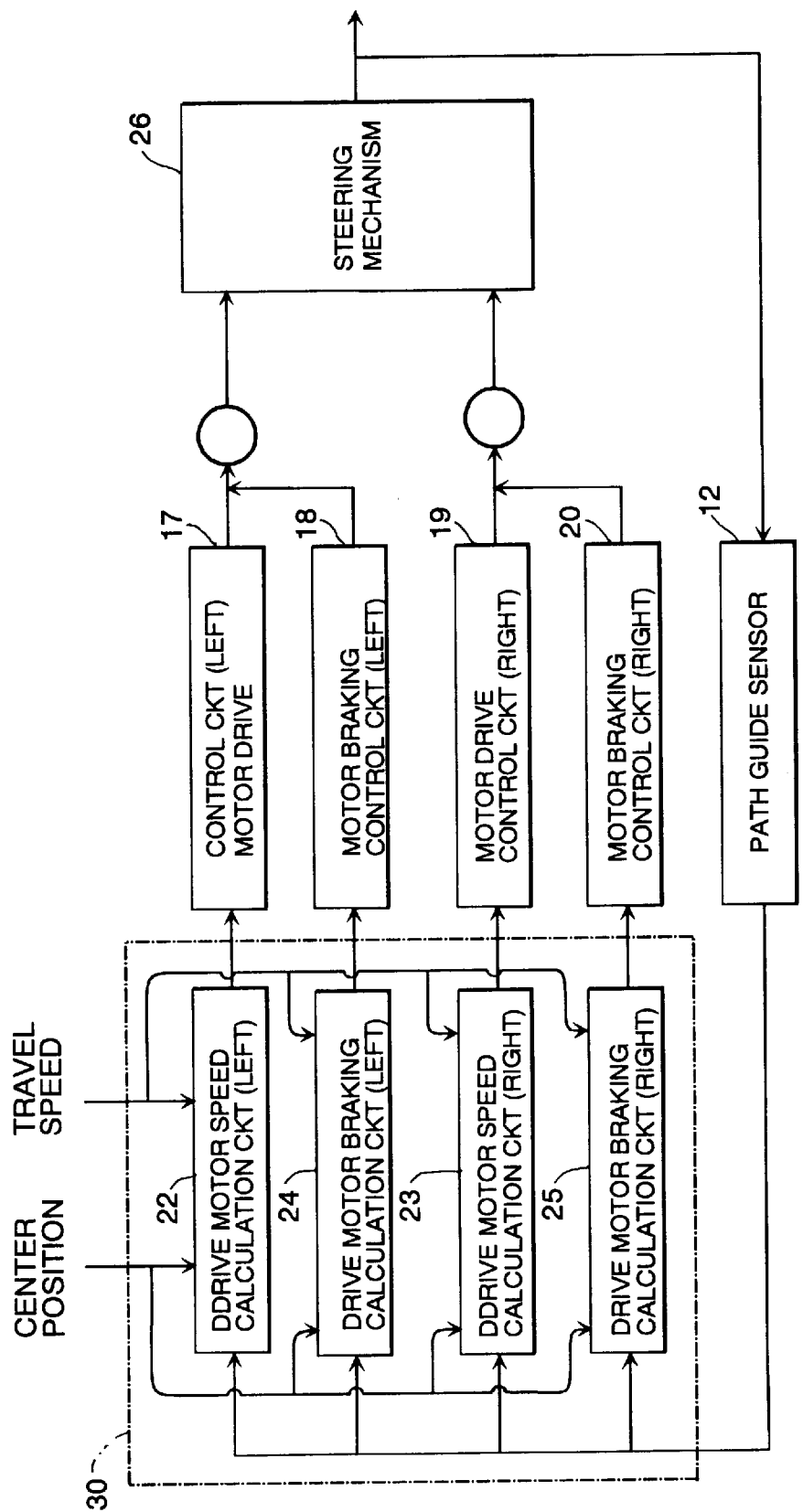
FIG. 6 is a functional block diagram equivalent to the block diagram of FIG. 5.

FIG. 6 shows a control block equivalent to the functional block shown in FIG. 5. The control unit (CPU) 30 has drive speed calculation circuits 22 and 23 and controlled braking variable calculation circuits 24 and 25 integrated therein. A center position value signal GPS and a speed command signal SCS are sent to the drive speed calculation circuits 22 and 23 and the controlled braking variable calculation circuits 24 and 25 for the drive motors 6 and 7. The results of calculations at these calculation circuits 22–25 are sent to the corresponding drive circuits 17 and 19 and brake circuits 18a and 20 and drive or brake independently the drive motors 6 and 7. By means of the controlled drive of the drive motors 6 and 7, the steering device 26 steers the vehicle 3 to follow the guide means 2. During traveling, the path guide sensor 12 detects a lateral deviation of the vehicle 3 from the center line CL2 of the path guide tape 2A and provides the respective calculation circuits 22–25 with a signal representing the lateral deviation. The drive motors 6 and 7 may be of the reversible type or of the non-reversible type.

Figure 7:
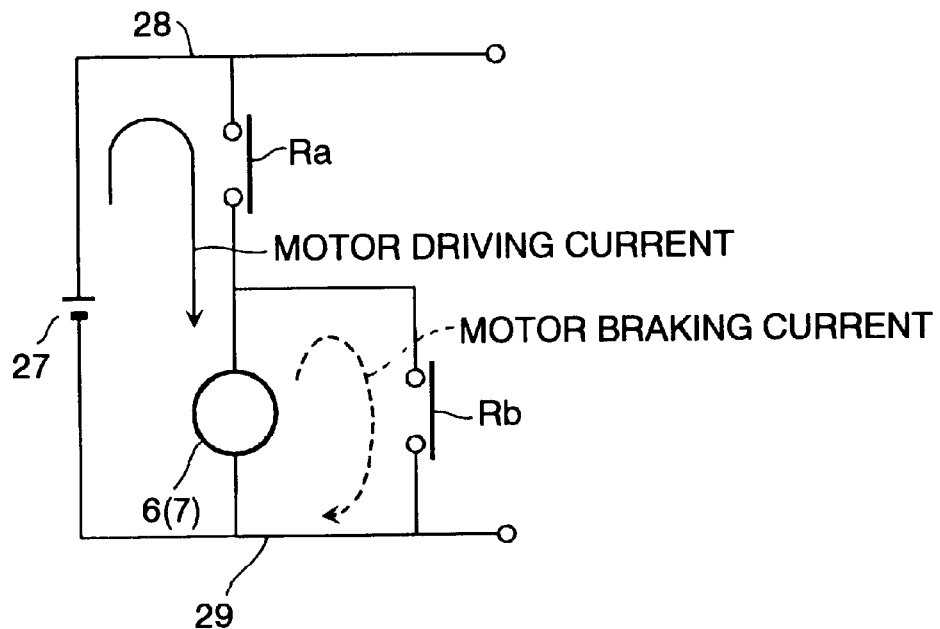
FIG. 7 is a combined driving/braking circuit for a non-reversible motor.
Figure 9:
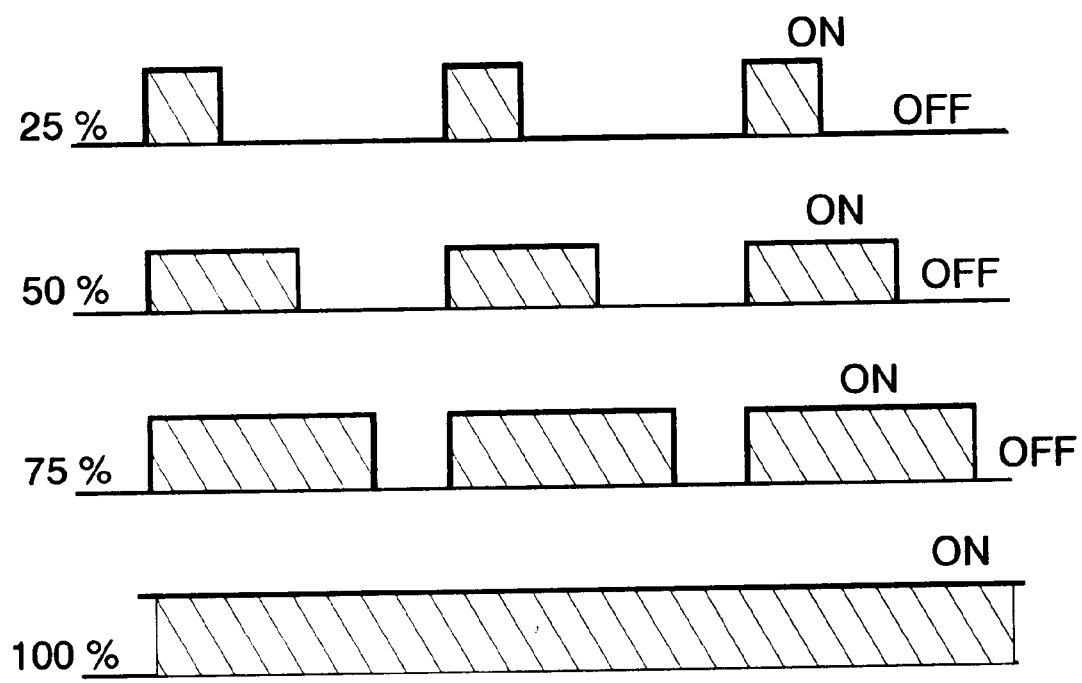
FIG. 9 is an illustration showing the pulse width modulation control.

FIG. 7 shows a combined driving/braking circuit for the non-reversible motor employed as the drive motor 6, 7. In the driving/braking circuit, the non-reversible drive motor 6, 7 is connected to a power source 27 through a positive power line 28 with a relay Ra installed therein and a negative power line 29. The driving/braking circuit is provided with another relay Rb in parallel to the non-reversible drive motor 6,7. These relays Ra and Rb are practically contact type relays. When a current flows across the non-reversible drive motor 6, 7 in the direction indicated by a solid line arrow as a result of controlling operation of the relay Ra by the pulse width modulation (PWM) control while keeping the contact relay Rb open, the non-reversible drive motor 6, 7 is activated to rotate. During deceleration, the non-reversible drive motor 6, 7 functions as a generator to regenerate a current (regenerated energy). Whenever it is necessary to brake the non-reversible drive motor 6, 7, a regenerated current is made to flow across the non-reversible drive motor 6, 7 in the direction indicated by a chained line arrow by controlling operation of the contact relay Rb by the pulse width modulation (PWM) control while keeping the contact relay Ra open. FIG. 9 shows various active ratios of 25%, 50%, 75% and 100%, by way of example. However, the active ratio may be set to any ratio between 0% and 100%. The operating patterns of the contact relays Ra and Rb in the above driving/braking control are summarized as follows:

| | RELAY | |
|---|---|---|
| MODE | Ra | Rb |
| DRIVE | PWM | OFF |
| BRAKE | OFF | PWM |

During the pulse width modulation (PWM) control for providing a generated current, the non-reversible drive motor 6, 7 works as a brake. On the other hand, while the pulse width modulation (PWM) control is not performed, the generated current is returned to the power source. Because the contact relays Ra and Rb have no contact resistance, the energy is not spent more than is necessary.

Figure 8:
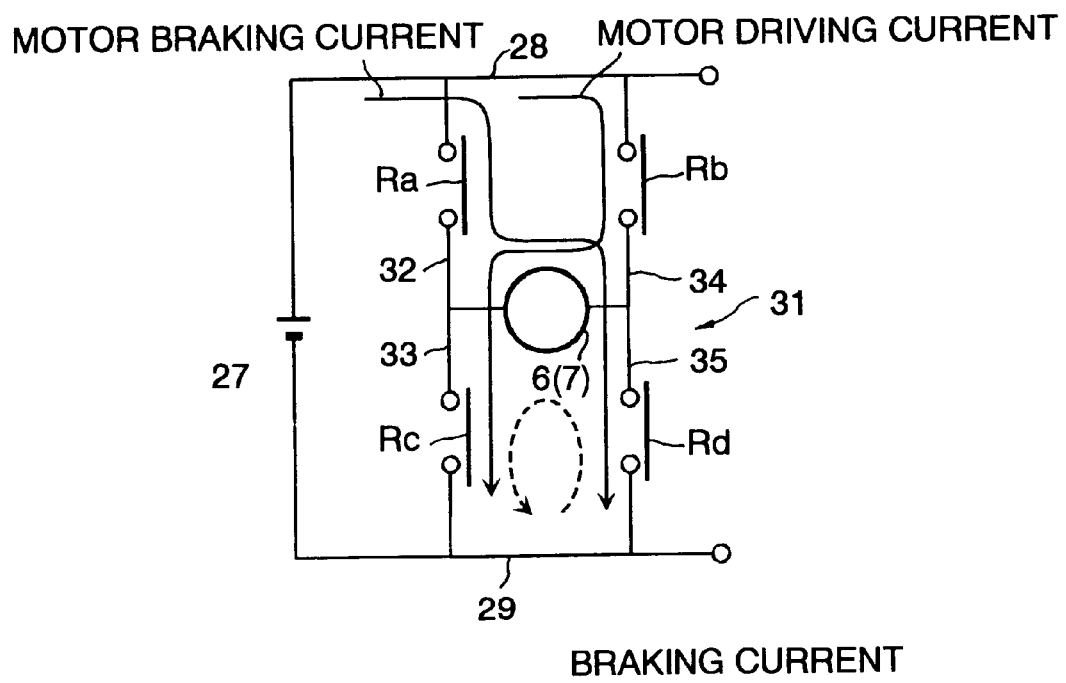
FIG. 8 is a combined driving/braking circuit for a reversible motor.

FIG. 8 shows a combined driving/braking circuit for the reversible motor employed as the drive motor 6, 7. The driving/braking circuit has an H-type bridge circuit 31 between a power line 28 and a negative power line 29 of a power source 27 in which the reversible drive motor 6, 7 is connected. The bridge circuit 31 includes contact relays Ra, Rb, Rc and Rd disposed in each connecting lines 32, 33, 34 and 35, respectively. Rotation in the normal direction of the reversible drive motor 6, 7 is made with a current flow in a direction shown by a solid line arrow caused by controlling operation of the contact relay Ra by the pulse width modulation (PWM) control while keeping the contact relays Rb and Rc open and the contact relay Rd closed. On the other hand, rotation in the reverse direction of the reversible drive motor 6, 7 is made with a current flow in a direction shown by a chained line arrow caused by controlling operation of the contact relay Rb by the pulse width modulation (PWM) control while keeping the contact relays Ra and Rd open and the contact relay Rc closed. the reversible drive motor 6, 7 is braked by controlling operation of the contact relays Rc and Rd by the pulse width modulation (PWM) control while keeping the contact relays Ra and Rb open during deceleration. The regenerated current caused during reverse rotation of the reversible drive motor 6, 7 flows in the opposite direction to the direction shown by a chained line arrow. The contact relay may be operated at any active ratio between 0% and 100%. The operating patterns of the contact relays Ra and Rb in the above driving/braking control are summarized as follows:

| | RELAY | | | |
|---|---|---|---|---|
| MODE | Ra | Rb | Rc | Rd |
| DRIVE (NORMAL) | PWM | OFF | OFF | ON |
| DRIVE (REVERSE) | OFF | PWM | ON | OFF |
| BRAKE | OFF | OFF | PWM | PWM |

In the travel direction control of the automatic guided vehicle 3 with speed differences between the right and left drive wheels 8 and 9, because the current flow across the reversible drive motor 6, 7 is reversed between normal rotation and reverse rotation, in the event the automatic guided vehicle enters a curved path section, the automatic guided vehicle 3 may be changed in traveling direction by reversing the polarity of current so as to impose reverse torque instantaneously on either one of the reversible motors 6 and 7 which has to be braked.

Figure 10:
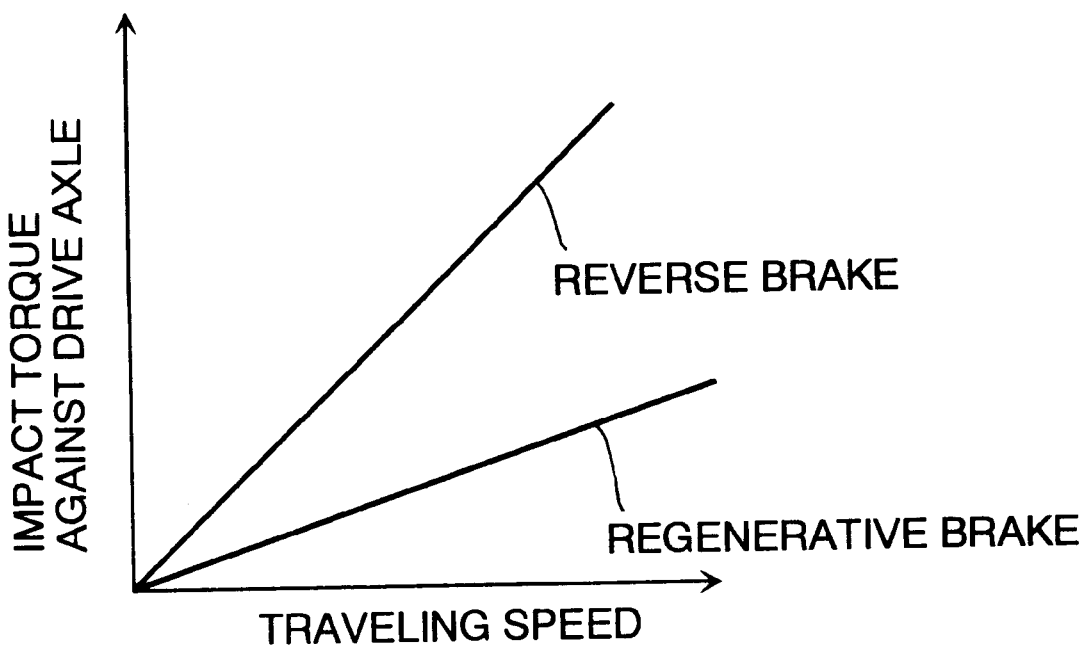
FIG. 10 is a graphical illustration showing impact torque acting on drive axles due to application of reverse braking and regenerative braking with respect to travel speed.

FIG. 10 shows a generalized relationship between impact imposed by regenerative braking and plugging or reverse braking against drive axles and travel speed. Generally, reverse braking imposes impact against the drive axles irrespective of travel speeds greater than regenerative braking. Such great impact acts on freight in the automatic guided vehicle with adverse effects. Further, reverse braking spends a great amount of electric power, it is desired for a battery-driven automatic guided vehicle to avoid the use of reverse braking. On the other hand, regenerative braking decreases braking force following a decrease in vehicle travel speed. In order for the automatic guided vehicle to stop perfectly at a specified position, the reverse braking is suitable more than the regenerative braking. Further, during traveling down on a slope at a constant speed, in particular at a low constant speed, there occurs a speed difference between a instructed travel speed and actual travel speed which gradually increases. For this travel condition, the regenerative braking which loses braking force as a decrease in vehicle travel speed is practically desirable. In view of this, the motor exciting circuit is changed over to selectively apply these reverse braking and regenerative braking according to the speed difference and vehicle speed.

Figure 11:
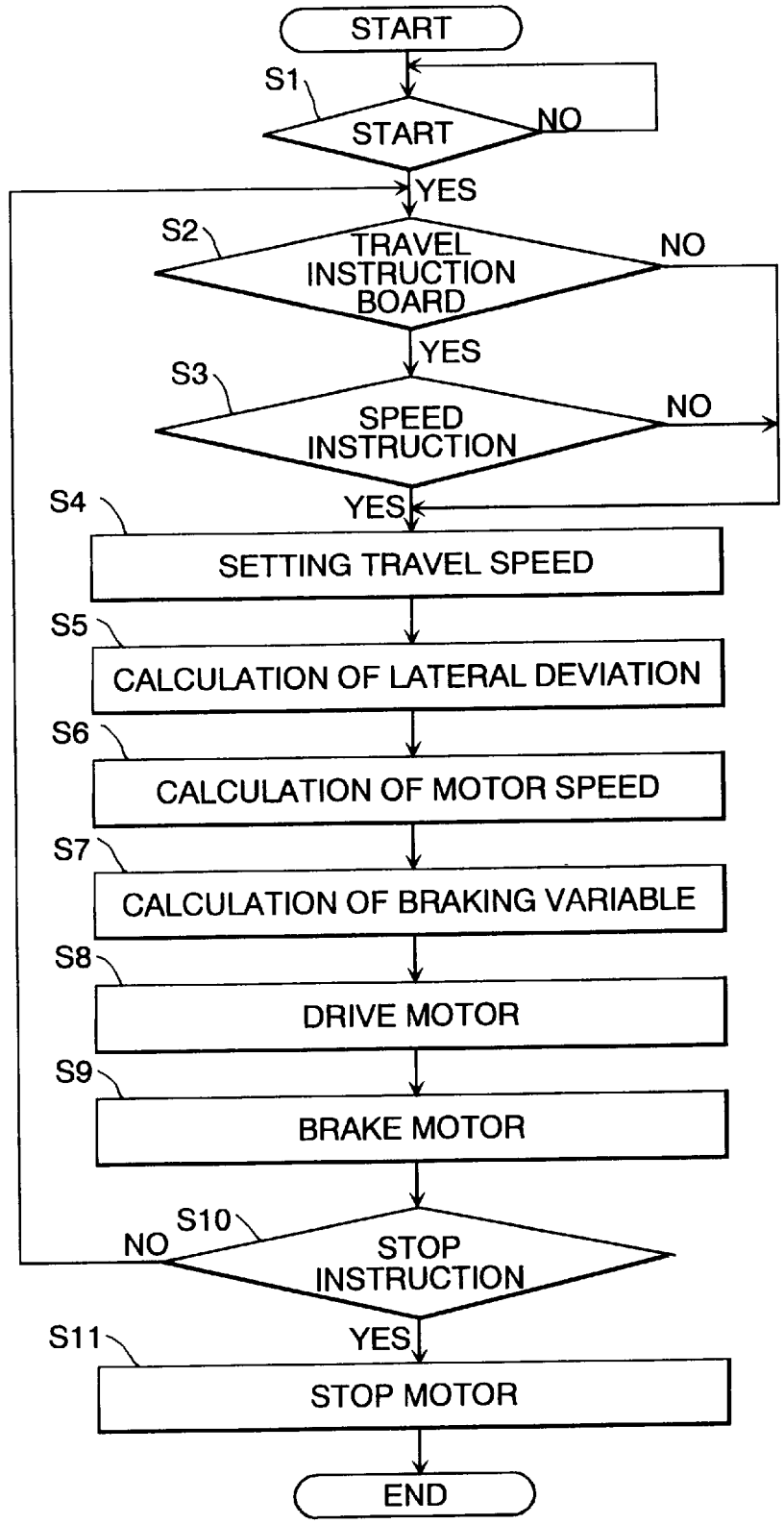
FIG. 11 is a flowchart illustrating the drive control sequential routine.

The automatic guided vehicle control system of the invention is performed following the sequential routine shown by a flowchart in FIG. 11.

Referring to FIG. 11, when the flowchart logic commences and control passed directly to a determination at step S1 as to whether the start/stop switch 15 is operated to provide a start command signal SACS for actuating the automatic guided vehicle 3. This determination is repeated until a start command signal SACS is provided. When the control unit 30 receives a start command signal SACS, a determination is made at step S2 as to whether the travel instruction sensor 14 detects a travel instruction tape or board 2B. When the travel instruction sensor 14 detects it, a determination is subsequently made at step S3 as to a speed command signal SCS is read and, if read, the vehicle speed must be changed. When the speed command signal SCS indicates a speed which is different from the current vehicle speed, then, a changed vehicle speed is set at step S4. However, the flowchart skips steps S3 and 4 if the travel instruction sensor 14 does not detect a travel instruction board 2B, or step S4 if the speed command signal SCS provided by the detected travel instruction board 2B indicates a speed equal to the current vehicle speed. Thereafter, at step S5, the control unit (CPU) 30 receives signals from the path guide sensor 12 and calculates a lateral position of the automatic guided vehicle 3, i.e. a lateral deviation of the automatic guided vehicle 3, relative to the path guide tape 2A according to the pattern of output of the sixteen sensor elements C1–C16. At step S6, the control unit (CPU) 30 calculates rotation of the drive motors 6 and 7 based on the lateral deviation of the automatic guided vehicle 3 from the drive control map M1. Subsequently, at step S7, the control unit (CPU) 30 calculates a controlled braking variable for controlling the regenerated energy during deceleration for either one of the drive motors 6 and 7 which is needed to be braked according to the lateral deviation from the brake control map M2. The drive motors 6 and 7 are driven to rotate at the speeds calculated at step S6, respectively, at step S8. Further, at step S9, the one of the drive motors 6 and 7 is braked according to the controlled braking variable calculated at step S7.

The pulse width modulation (PWM) control is performed for the drive of the drive motors 6 and 7 and for the braking of the drive motor 6 or 7.

At step S10, a determination is made as to whether the start/stop switch 15 is operated and provides a stop command signal SACS, or the travel instruction sensor 14 detects a travel instruction board 2B which provides a stop command signal SACS, for stopping the automatic guided vehicle 3 to bring the automatic guided vehicle 3 into a halt at the unloading station labeled "α" (FIG. 4). Unless a stop command signal SACS is provided, the flowchart repeats steps S2 through S10. When the control unit (CPU) 30 receives a stop command signal SACS, it stops the drive motors 6 and 7 at step S11.

As described above, the automatic guided vehicle control method in which the traveling direction or traveling path is controlled by driving the right and left drive wheels 8 and 9 at different speeds, during braking the right and left drive wheels 8 and 9 for cornering, controlling the travelling direction of the automatic guided vehicle 3 is performed by imposing reverse torque on one of the drive motors 6 and 7 for either one of the wheels 8 and 9 which has to be braked. Accordingly, when the automatic guided vehicle 3 tends to shift laterally with respect to the travel path defined by the path guide tape 2A, correction of the lateral deviation is certainly made by imposing reverse torque on and applying brake to either one of the drive motors 6 and 7. Even if the automatic guided vehicle 3 has great inertial force, it is controlled to smoothly turn a relatively sharp corner and consequently can travel at relatively high speeds.

Because, the traveling direction of the automatic guided vehicle 3 is controlled by regulating the amount of consumption of regenerated energy generated by the drive motors 6 and 7 which work as electric generators during deceleration and continuously rotate with inertial force, the automatic guided vehicle 3 is not under necessity of having any mechanical braking device for correcting the traveling direction. Furthermore, because, when the difference between demanded speeds on the drive motors 6 and 7 exceeds above a specific value, regenerative braking is applied to one of the drive motors 6 and 7 for either one of the right and left drive wheels 8 and 9 which has to be braked, significant lateral deviations are corrected by controlling the traveling path by making effective use of regenerated energy. Because the drive control map M1 and brake control map M2 are allocate as control rules in the RAM 21, they are easily changeable according to vehicle models and/or vehicle weight, which provides a widened use of control rules. accordingly, it is easy to take steps to meet changes and modifications in travel path. The traveling direction control in which the traveling direction is performed according to the speed difference between the right and left drive wheels 8 and 9 controls regenerated energy according to lateral deviations during deceleration. Accordingly, the traveling direction control can make effective use of the regenerated energy to perform ensured correction on the traveling direction of the automatic guided vehicle 3. The control circuit in which the motor driving and braking circuits are integrated is simplified in structure. Although the control system has a simple structure in which the motor drive circuit 17, 18 is provided together with the motor brake control circuit (relays Ra and Rb in FIG. 7 or relays Rc and Rd in FIG. 8), the braking control and driving control of the automatic guided vehicle 3 is ensured by making effective use of the regenerated energy. Control of the consumption of regenerated energy by the pulse width modulation (PWM) control realizes liner braking control with an effect of reducing a loss of generated energy. The selective use of drive control map M1 and brake control map M2 ensures precise traveling path control and well controlled braking. The use of control maps M1 and M2 makes it easy to change, replace or modify control rules.

Figure 12:
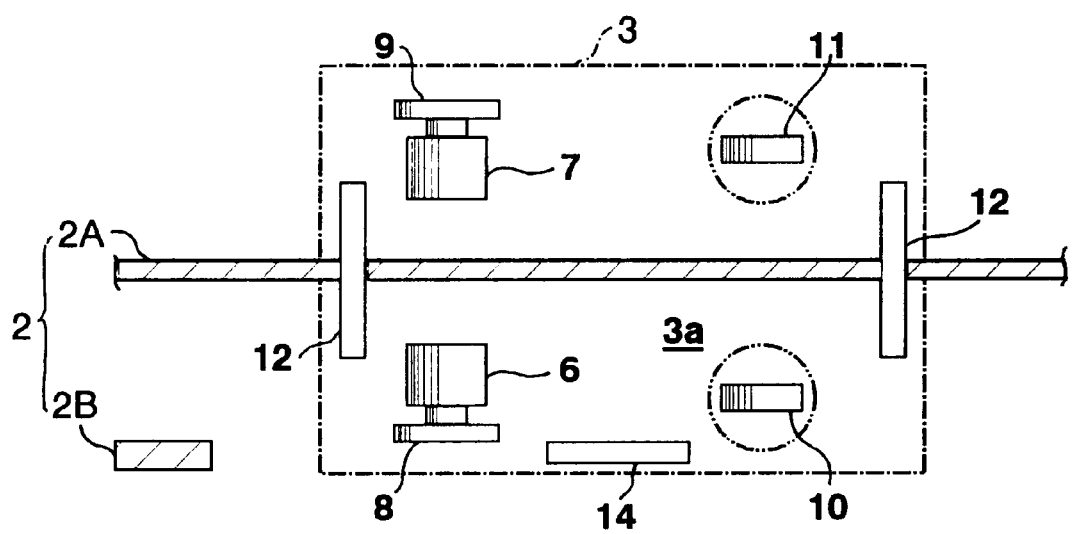
FIG. 12 is a bottom view of the automatic guided vehicle according to another embodiment of the invention.

The control system may be installed to a automatic guided vehicle shown in FIG. 12 which is similar to the automatic guided vehicle shown in FIGS. 1 and 2, excepting a steering device does not have a steering disk.

The path guide sensor 12 and the travel instruction sensor 14 may be magnetic sensors if a magnetic guide tape is employed as the guide means 2 or may be optical sensors if an optically detectable guide tape is employed as the guide means 2. The path guide sensor 12 may be of a photoelectric type if an optically reflective member or material is employed as the guide means 2. For example, if a white paint is applied to the floor 1 as the path guide 2A, the path guide sensor 12 may comprise a row of photocell elements. Further, if an electric conductor wire which is able to generate a magnetic field with an induction current, the path guide sensor 12 may comprise a row of cylindrical probe coils.

Figure 13:
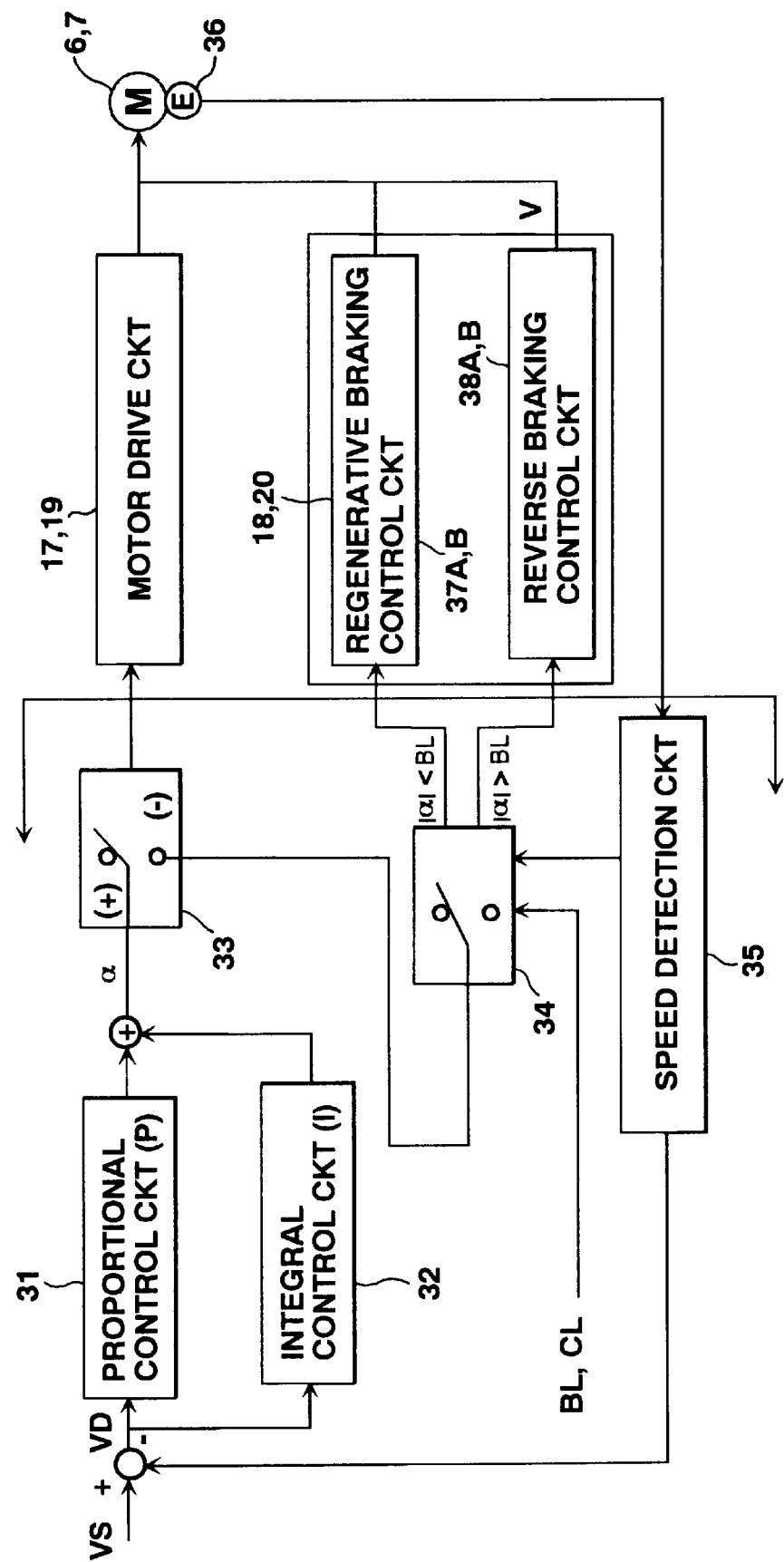
FIG. 13 is a block diagram of a drive control system.

FIG. 13 shows a drive control system in a block diagram according to another embodiment of the invention in which reverse braking and regenerative braking are selectively applied. The same control system as shown in FIG. 13 is provided for each of the right and left wheel drive motors 6 and 7. An instructed travel speed VS read by the travel instruction sensor 14 is sent to control unit (CPU) 30. An actual traveling speed V (VL for the left drive motor and VR for the right drive motor) is obtained at a speed detection circuit by converting the rotational speed of the drive motor detected by an encoder 36. The speed difference VD (VDL between these instructed speed and actual rotational speed V (VDL for the left drive motor and VDR for the right drive motor) is subjected to PI control operation at a proportional control circuit (P) and integral control circuit (I) in a well known manner. The sum "α" of outputs from the proportional control circuit (P) and the integral control circuit (I) is judged regarding its sign at sign judging circuit 33. When the output "α" is positive or plus, it is directly forwarded to the motor drive circuit 17, 19. On the other hand, when the output "α" is negative or minus, then, it is compared with a critical difference BL at judging circuit 34. When the absolute value of the output "α" is equal to or less than the critical difference BL, then, it is forwarded to a regenerative braking circuit 37. On the other hand, when the absolute value of the output "α" is greater than the critical difference BL, then, it is forwarded to a reverse braking circuit 38. Further, since the regenerative braking provides sufficient braking force when the actual traveling speed is somewhat greater, the regenerative braking is preferentially applied when the actual traveling is lower than a critical speed CL.

Figure 14A:
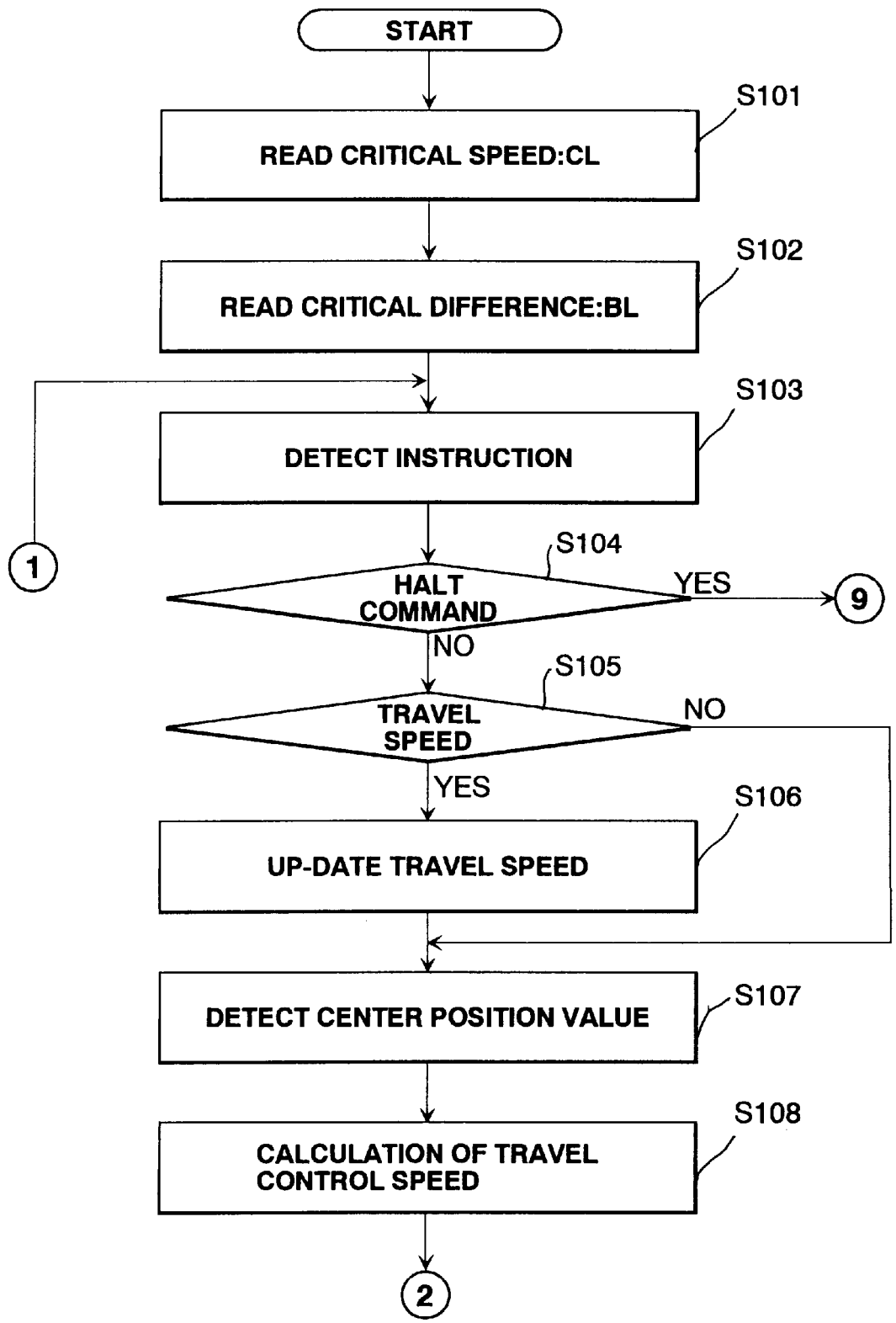
FIGS. 14A to 14C are a flowchart illustrating the drive speed control sequential routine.
Figure 14B:
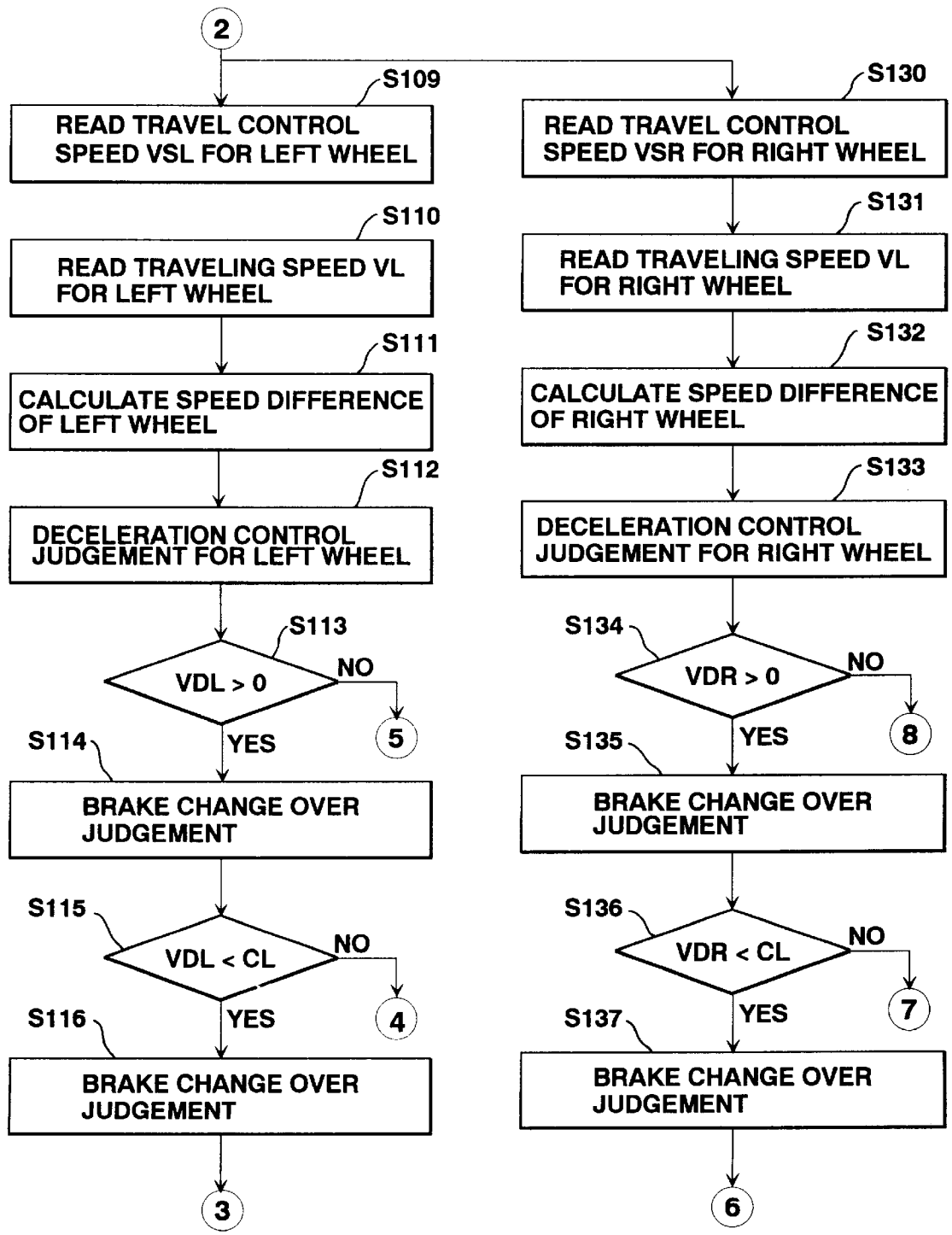
Figure 14C:
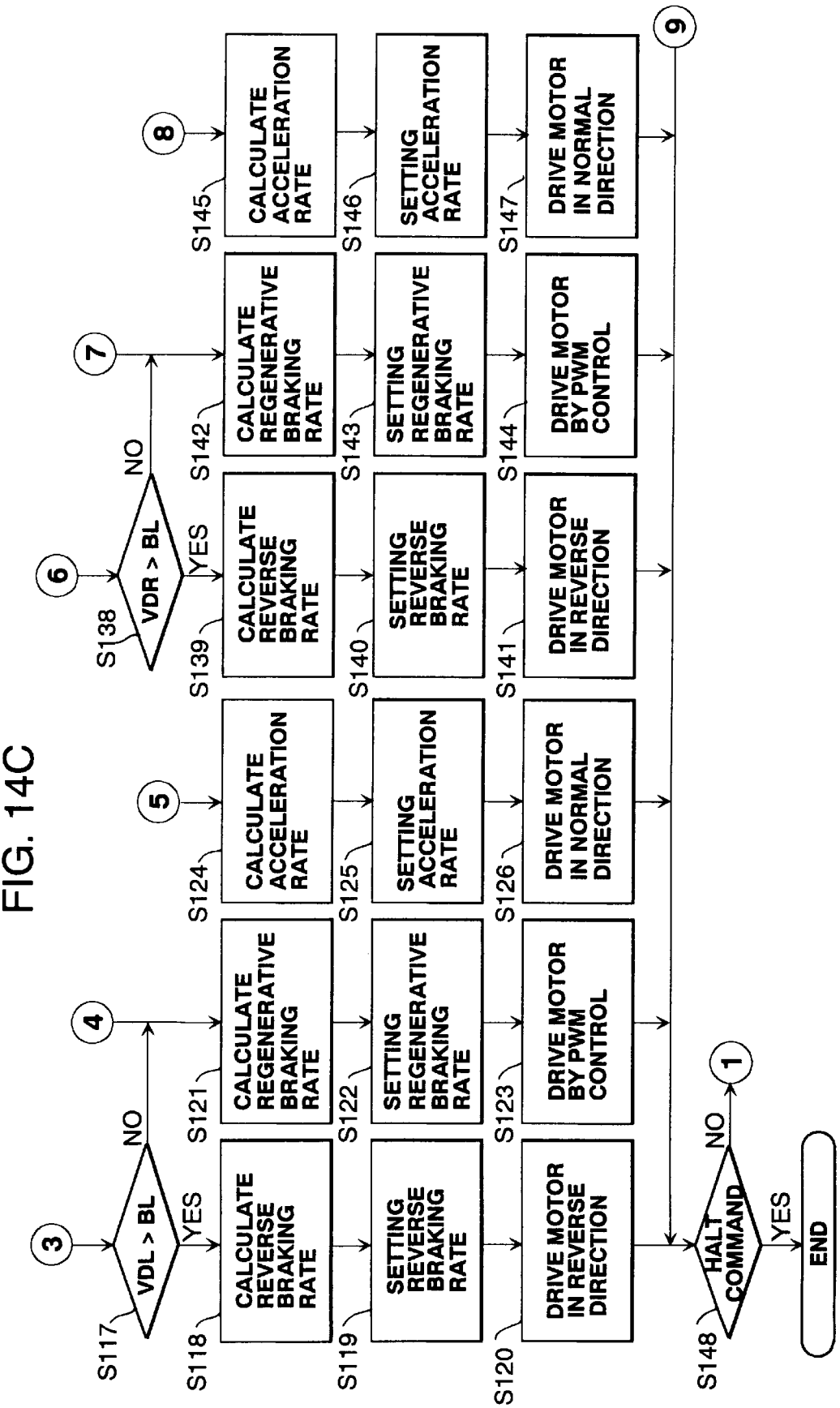

FIGS. 14A through 14C are a flowchart illustrating the sequential routine of the variable brake control performed in the vehicle drive control. When the flowchart logic commences and control passed directly to a function block at step S101 where the critical speed CL is read. Subsequently, the critical difference BL is read at step S102. After reading a travel instruction code from a travel instruction board 2B at step S103, a determination is made at step S104 as to whether or not the travel instruction code indicates a halt command. When detecting a halt command, another determination concerning a halt instruction is made at step S148. If the answer to the decision is affirmative, then, the brake changeover control terminates. On the other hand, when detecting an instruction other than a halt command, the flowchart logic returns to step S103 and repeats again.

When the travel instruction code indicates an instruction other than a halt command, a determination is made at step S105 as to whether or not the travel instruction code indicates a travel speed. After storing the travel instruction speed in RAM 21 as an up-date travel instruction speed at step S106 when the answer is affirmative, or directly when the travel instruction code provides instructions other than travel instruction speeds, the flowchart logic proceeds to step S107 where a center position value is detected as a lateral deviation of the automatic guided vehicle 3 from the path guide tape 2A at step S107. Travel control speeds for the drive wheels 8 and 9 are calculated based on the lateral deviation and the up-dated travel speed at step S108. After reading the rotational speed calculated at step S108 as a travel control speed VSL of the left drive wheel at step S109 and reading the actual traveling speed VL of the left drive wheel at S110 subsequently, the speed difference of the actual traveling speed from the travel control speed VSL for the left drive wheel VDL is calculated at step S111. Subsequently to a deceleration control judgement at step S112, a determination is made at step S113 as to whether deceleration is necessary, in other word, whether or not the speed difference of the left drive wheel VDL is greater than zero. When the speed difference VDL is equal to or less than zero, an acceleration rate is calculated at step S124. Subsequently, the contact switches Ra–Rd are operated based on the acceleration rate by the pulse width modulation control (PWM) at step S125 to drive the drive motor 6 in the normal direction at step S126. On the other hand, when the speed difference VDL is greater than zero, subsequently to a brake changeover judgement based on the critical speed CL at step S114, a determination is made at step S115 as to whether or not both regenerative braking and reverse braking are demanded to apply. This determination is made by comparing the speed difference VDL with the critical speed CL. When the speed difference VDL is greater than the critical speed CL, then, a regenerative braking rate is calculated at step S121. Subsequently, the contact switches Ra–Rd are operated based on the regenerative braking rate by the pulse width modulation control (PWM) at step S122 to drive the drive motor 6 so as to produce desired generated energy. On the other hand, when the speed difference VDL is equal to or less than the critical speed CL, then, subsequently to brake changeover judgement according to the critical difference BL at step S116, a determination is made at step S117 as to whether the reverse braking is demanded. When the speed difference VDL is equal to or greater than the critical difference BL, a reverse braking rate is calculated at step S11 8. Subsequently, the contact switches Ra–Rd are operated based on the reverse braking rate by the pulse width modulation control (PWM) at step S119 to drive the drive motor 6 in the reverse direction. For the right drive motor 7, the same operation is performed through steps S130–S147.

After driving the drive motors 6, 7, at step S120 and S141, S123 and S144, or S126 and S147, a determination concerning a halt command is made at step S148. If the answer to the decision is affirmative, then, the brake changeover control terminates. On the other hand, when detecting an instruction other than a halt command, the flowchart logic returns to step S103 and repeats to detect an travel instruction of another instruction board 2B.

FIG. 15 illustrates the variable brake control in the case where the automatic guided vehicle 3 travels on a down slope with an increasing traveling speed V from a cruising speed at a point P. Before the point P, the speed difference VD is less than the critical difference BL, and hence the regenerative braking is slackly applied to brake the automatic guided vehicle 3. However, if the automatic guided vehicle 3 does not sufficiently slow down with the regenerative braking, and the speed difference VD becomes greater than the critical difference BL, the reverse braking is applied at the point P. Near points Q and R where the traveling speed V is higher than the critical speed CL, the reverse braking is applied to brake the automatic guided vehicle 3 with a sufficient braking effect. Near a point S where the travel control speed VS is suddenly lowered below the critical speed CL, after the regenerative braking, reverse braking are applied in this order, the regenerative braking is applied again. The regenerative braking is effected with relatively small braking force at the beginning and the ending of this successive braking, which is desirable for the automatic guided vehicle 3 to travel stably. When bringing the automatic guided vehicle 3 into a complete halt, since the regenerative braking under low traveling speeds is undesirable, the reverse braking is applied for traveling speeds with speed differences higher then the critical difference BL.

Although the present invention has been fully described by way of specific example with reference to the accompanying drawings, it is to be understood that various changes and modifications may occur to those skilled in the art. Unless such changes and modifications otherwise depart from the scope of the invention, they are intended to be covered by the following claims.

What is claimed is:

1. A vehicle control method for controlling a direction of a self drive vehicle by differentially driving electric motors for driving right and left drive wheels, said vehicle control method comprising the steps of:

detecting a lateral deviation of said self drive vehicle from a prearranged travel path which is established by guide means;

calculating a speed difference between rotational speeds of said electric motors necessary to correct said lateral deviation; and applying reverse torque to said electric motors according to said speed difference to differentially drive said right and left wheels.

2. A vehicle control method as defined in claim 1, wherein said reverse torque is varied by controlling a consumption of regenerative energy of said motor during deceleration.

3. A vehicle control method as defined in claim 2, wherein either one of said motors is driven by regenerative control when said speed difference is greater than a specified speed difference.

4. A vehicle control method as defined in claim 3, further comprising the step of applying reverse braking during deceleration when said speed difference is greater than a specified speed difference.

5. A vehicle control method as defined in claim 1, wherein said motors are controlled by a brake control map prescribing a relationship between lateral deviation and controlled braking variable.

6. A vehicle control method as defined in claim 1, and further comprising the step of controlling a speed of said automatic guided vehicle by a forward drive control map prescribing a relationship between lateral deviation and motor speed.

7. A vehicle control method as defined in claim 1, and further comprising the step of controlling a speed of said automatic guided vehicle by a backward drive control map prescribing a relationship between lateral deviation and motor speed.

8. A vehicle control method as defined in claim 1, wherein said lateral deviation of said self-drive vehicle from a prearranged travel path is detected by a sensor.

9. A vehicle control method as defined in claim 8, wherein said guide means is disposed on a floor.

10. A vehicle control method as defined in claim 9, wherein a guide means comprises a magnetic tape disposed on said floor and said sensor comprises a magnetic sensor.

11. A vehicle control method as defined in claim 1, wherein said electric motors are attached to said right and left drive wheels, respectively, and controlled by a controller according to said lateral deviation so as to remove said lateral deviation of said self-drive vehicle from said prearranged travel path.

12. A vehicle control method as defined in claim 1, wherein said guide means includes travel instruction means for indicating travel speed of said self-drive vehicle to which a traveling speed is decreasingly changed.

13. A vehicle control method as defined in claim 12, and further comprising the step of reading said travel instruction means.

14. A vehicle control method as defined in claim 1, wherein said self-drive vehicle is controlled in speed based on a map defining a relationship between rotational speeds of said electric motors and said lateral deviations.

15. A vehicle control system for controlling a self-drive vehicle which is guided by path guide means to travel on a prearranged travel path established by said path guide means and controlling a traveling direction of said self-drive vehicle by driving right and left drive wheels at different speeds, said vehicle control system comprising:

electric motors for driving said right and left drive wheels, respectively; and control means for detecting whether there is a demand of deceleration, detecting a lateral deviation of said self-drive vehicle from said path guide means and controlling regenerated energy of said electric motor according to said lateral deviation when said deceleration demand is detected.

16. A vehicle control system as defined in claim 15, wherein said control means includes a circuit for motor drive control and motor braking control for each said motor.

17. A vehicle control system as defined in claim 15, wherein said control means controls consumption of said regenerated energy by pulse width modulation control.

18. A vehicle control system as defined in claim 17, wherein said control means reverses said motor for braking during deceleration.

19. A vehicle control system as defined in claim 15, wherein said control means controls said motor by a brake control map prescribing a relationship between lateral deviation and controlled braking variable.

20. A vehicle control system as defined in claim 15, wherein said control means controls said motor by a drive control map prescribing a relationship between lateral deviation and motor speed and a brake control map prescribing a relationship between lateral deviation and controlled braking variable which are selectively used.

21. A vehicle control system as defined in claim 15, wherein said control means controls said motor by a forward drive control map prescribing a relationship between lateral deviation and motor speed, a backward drive control map prescribing a relationship between lateral deviation and motor speed, and a brake control map prescribing a relationship between lateral deviation and controlled braking variable which are selectively used.

22. A vehicle control system as defined in claim 15, wherein said guide means includes travel instruction means for indicating travel speed of said automatic guided vehicle to which a traveling speed is decreasingly changed.

23. A vehicle control system as defined in claim 22, and further comprising a sensor for reading said travel instruction means.

24. A vehicle control system as defined in claim 15, wherein said lateral deviation of said self-drive vehicle from a prearranged travel path is detected by a sensor.

25. A vehicle control system as defined in claim 24, wherein said guide means is disposed on a floor.

26. A vehicle control system as defined in claim 25, wherein a guide means comprises a magnetic tape disposed on said floor and said sensor comprises a magnetic sensor.

27. A vehicle control system as defined in claim 15, wherein said electric motors are attached to said right and left drive wheels, respectively, and controlled by a controller according to said lateral deviation so as to remove said lateral deviation of said self-drive vehicle from said prearranged travel path.

28. A vehicle control system as defined in claim 15, wherein said self-drive vehicle is controlled in speed based on a map defining a relationship between rotational speeds of said electric motors and said lateral deviations.

29. A vehicle control method for controlling a direction of a automatic guided vehicle by differentially driving motors for driving right and left drive wheels, said vehicle control method comprising the steps of:

detecting a lateral deviation of said automatic guided vehicle from a prearranged travel path;

calculating a speed difference between rotational speeds of said motors necessary to correct said lateral deviation;

applying reverse torque to said motors according to said speed difference to differentially drive said right and left wheels; and controlling a speed of said automatic guided vehicle by a forward drive control map prescribing a relationship between lateral deviation and motor speed.

30. A vehicle control method for controlling a direction of a automatic guided vehicle by differentially driving motors for driving right and left drive wheels, said vehicle control method comprising the steps of:

detecting a lateral deviation of said automatic guided vehicle from a prearranged travel path;

calculating a speed difference between rotational speeds of said motors necessary to correct said lateral deviation;

applying reverse torque to said motors according to said speed difference to differentially drive said right and left wheels; and controlling a speed of said automatic guided vehicle by a backward drive control map prescribing a relationship between lateral deviation and motor speed.

31. A vehicle control system for controlling a automatic guided vehicle which is guided by path guide means to travel on a prearranged path established by said path guide means and controlling a traveling direction of said automatic guided vehicle by driving right and left drive wheels at different speeds, said vehicle control system comprising:

motors for driving said right and left drive wheels, respectively;

control means for detecting whether there is a demand of deceleration, detecting a lateral deviation of said automatic guided vehicle from said path guide means and controlling regenerated energy of said motor according to said lateral deviation when said deceleration demand is detected; and wherein said control means controls said motor by a drive control map prescribing a relationship between lateral deviation and motor speed and a brake control map prescribing a relationship between lateral deviation and controlled braking variable which are selectively used.

32. A vehicle control system for controlling a automatic guided vehicle which is guided by path guide means to travel on a prearranged path established by said path guide means and controlling a traveling direction of said automatic guided vehicle by driving right and left drive wheels at different speeds, said vehicle control system comprising:

motors for driving said right and left drive wheels, respectively; and control means for detecting whether there is a demand of deceleration, detecting a lateral deviation of said automatic guided vehicle from said path guide means and controlling regenerated energy of said motor according to said lateral deviation when said deceleration demand is detected; and wherein said control means controls said motor by a forward drive control map prescribing a relationship between lateral deviation and motor speed, a backward drive control map prescribing a relationship between lateral deviation and motor speed, and a brake control map prescribing a relationship between lateral deviation and controlled braking variable which are selectively used.

* * * * *